United States Patent [19]

Kinsella et al.

[11] 4,348,479

[45] * Sep. 7, 1982

[54] RECOVERY OF PROTEINACEOUS MATERIAL HAVING REDUCED NUCLEIC ACID LEVELS

[75] Inventors: John E. Kinsella; Jayarama K. Shetty, both of Ithaca, N.Y.

[73] Assignee: Cornell Research Foundation, Inc., Ithaca, N.Y.

[*] Notice: The portion of the term of this patent subsequent to Sep. 18, 1996, has been disclaimed.

[21] Appl. No.: 179,382

[22] Filed: Aug. 18, 1980

[51] Int. Cl.$^3$ ................................................ A23J 1/18
[52] U.S. Cl. ................................ 435/183; 260/112 R; 426/60; 426/61; 426/62; 426/656; 435/814
[58] Field of Search ............... 260/112 R; 426/60, 61, 426/62, 656; 435/183, 814

[56] References Cited

U.S. PATENT DOCUMENTS

| | | |
|---|---|---|
| 3,867,255 | 2/1975 | Newell et al. ................... 260/112 R |
| 3,903,314 | 9/1975 | Chao ................................ 260/112 R |
| 3,937,693 | 2/1976 | Towersey et al. ............... 260/112 R |
| 4,133,904 | 1/1979 | Steer et al. ...................... 260/112 R |
| 4,135,000 | 1/1979 | Schuldt, Jr. ..................... 260/112 R |
| 4,168,262 | 9/1979 | Kinsella et al. ................. 260/112 R |
| 4,206,243 | 6/1980 | Schlingmann et al. ......... 260/112 R |

OTHER PUBLICATIONS

"Reaction of Proteins with Citraconic Anhydride", by M. Z. Atassi et al., *Methods in Enzymology*, vol. 25, (1972), pp. 546–553.

*Primary Examiner*—Howard E. Schain
*Attorney, Agent, or Firm*—Jones, Tullar & Cooper

[57] ABSTRACT

The present invention relates to a process which comprises recovering proteinaceous materials from nucleoprotein complexes by derivatizing the proteinaceous material with a cyclic anhydride, thereby disassocating the complex, separating the derivatized proteinaceous material from the nucleic acids and subsequently regenerating the proteinaceous material. The recovery of the proteinaceous material is accomplished by maintaining the separated derivatized proteinaceous material at a suitable acidic pH, which is a function of the reaction time and the temperature, until the derivatized proteinaceous material is disassociated into the proteinaceous material and the cyclic anhydride or most usually the equivalent acid and the proteinaceous material is recovered.

8 Claims, No Drawings

RECOVERY OF PROTEINACEOUS MATERIAL HAVING REDUCED NUCLEIC ACID LEVELS

BACKGROUND OF THE INVENTION

In recent years much attention has been directed toward the development of new sources of protein for human consumption. There exists a need for protein material which can be incorporated in foods or which is usable as a basic proteinaceous substance for human consumption.

One possible solution to the problem of supplying the ever increasing world-wide need for food protein is provided by processes for the bio-synthetic manufacture of protein through the growth of microorganisms on various substrates. It is known, for example, that microorganisms such as bacteria and yeast, which are grown by single-cell reproduction, contain high proportions of proteins and can be treated to recover protein isolate.

In order for single-cell proteins to compete with vegetable proteins and to share the protein market, it is necessary that it be processed to remove nucleic acid, primarily ribonucleic acid (RNA).

The human metabolic system produces uric acid as the result of the metabolism of materials such as ribonucleic acid. Since man does not have a uricase enzyme system, uric acid is not broken down and excreted with urine. However, if produced in larger quantities than the body can excrete, the body stores uric acid leading to the condition known as gout.

In 1972, the Recommended Daily Allowance of The Food and Nutrition Board, National Research Counsel in protein was 65 grams per day for a 70 kilogram adult male. The Protein Advisory Group of the United Nations System recommended that the amount of nucleic acid ingested per day from microbial protein should be less than 2 grams. Therefore, the nucleic acid content of the protein should be less than 6%, if microbial protein supplied 50% of dietary protein. The nucleic acid content should be below about 3%, if microbial protein is the sole source of protein in the diet.

U.S. Pat. No. 4,168,262, to Kinsella et al., displays a process for reducing nucleic acid in microbial derived protein. This process is accomplished by disrupting microbial protein containing cells and then derivatizing the resultant mixture comprising protein, cell debris and nucleic acid with an acid anhydride, and then isoelectrically precipitating a nucleic acid diminished protein containing fraction, from a nucleic acid enriched supernatant. The protein product of this process is obtained as a derivatized protein such as citraconylated protein.

DESCRIPTION OF THE INVENTION

The present invention relates to a process which comprises recovering proteinaceous material from nucleoprotein complexes by derivatizing the proteinaceous material with a cyclic anhydride, thereby disassociating the complex, separating the derivatized proteinaceous material from the nucleic acids and subsequently regenerating the proteinaceous material. The recovery of the proteinaceous material is accomplished by maintaining the separated derivatized proteinaceous at a suitable acidic pH, which is a function of the reaction time and the temperature, until the derivatized proteinaceous material is disassociated into the proteinaceous material and the cyclic anhydride or most usually the equivalent acid and the proteinaceous material is recovered.

The present process is applicable to the separation and recovery of biologically derived proteinaceous materials associated with nucleic acids. The separable proteinaceous materials contain a pendant primary amino group, which forms the nucleoprotein complex. While it is understood that the separation and recovery technique of the present invention is applicable to all such biologically derived proteinaceous materials, e.g. proteins, peptides, or enzymes, associated with nucleic acids, it will be discussed and exemplified using the separation and recovery of cell derived protein. The process is also particularly useful in separating primary amino group containing enzymes bound to or otherwise associated with nucleic acids, for example, the separation of ribonucleases and similar proteolytic enzymes from nucleic acids, particularly ribonucleic acid.

The practice of this invention is broadly applicable to biological materials particularly cellular materials and especially microorganisms; and particularly to those organisms classified as bacteria, yeasts, and fungi. By way of illustration bacteria such as those listed in Table I, yeasts such as those listed in Table II, and fungi such as those listed in Table III are suitable microorganisms.

TABLE I—SUITABLE BACTERIA

Acetobacter sp.
Arthrobacter sp.
*Bacillus subtilis*
Corynebacteria sp.
Micrococcus sp.
Pseudomonas sp.

TABLE II—SUITABLE YEASTS

*Candida curvata*
*Candida lipolytica*
*Candida pulcherima*
*Candida utilis*
*Hansenula anomala*
*Hansenula miso*
*Oidium lactis*
*Succharomyces carlsbergensis*
*Saccharomyces fragilis*
*Saccharomyces elipsoideus*
*Trichosporon cutameum*
*Saccharomyces cerevisiae*
*Candida parapsilosis*
*Hansenula wickerhamii*
*Pichia pastoris*
*Pichia haploghyla*

TABLE III—SUITABLE FUNGI

*Aspergillus niger*
*Aspergillus glaucus*
*Aspergillus oryzae*
*Aspergillus terreus*
*Aspergillus itaconicus*
*Penicillium notatum*
*Penicillium chrysogenum*
*Penicillium glaucum*
*Penicillium griseofulvum*
*Penicillium funiculosum*
*Fusarium graminearum* (ATCC 20334)
*Fusarium solani* (ATCC 20328)
*Fusarium oxysorium* (ATCC 201281)

*Candia utilis, Saccaromyces cerevisiae, Saccharomyces fragilis,* and *Saccharomyces carlsbergensis* are preferred starting materials for the process of this invention, however, because each has been generally regarded by the F.D.A. as safe for use in food products.

Microbial cells suitable for the process of this invention may be grown aerobically in either a batch or continuous manner. Any suitable carbon-affording substrate may be employed although, for purposes of preparing SCP products for use in foods, an ethanol substrate is preferred. Any convention combination of mineral nutrient elements may be employed. A convenient source of nitrogen is ammonia which may also be supplied to the fermentor as required to maintain the pH of the fermentation broth, preferably within the range from 3.5 to 5.5. Cells which have been grown at a rapid rate usually have a higher nucleic acid content while those grown more slowly tend to have a more permeable cell wall. Either of these types, as well as cells grown under oxygen-limiting or substrate-limiting conditions may be usefully treated according to the present invention to afford improved and acceptable foods and food components suitable for human consumption.

Rupture of the cells may be accomplished by any suitable physical means at appropriate temperatures. Thus, for example, any homogenizer, colloid mill, ball mill, or ultrasonic device may be employed.

In the process of the invention, derivatization of the proteinaceous material-nucleic acid mixture is accomplished by contacting the mixture with an organic dicarboxylic acid anhydride. The selection of the anhydride is critical for the ultimate recovery of a non-modified proteinaceous material as only anhydrides with can be removed from the proteinaceous material after separation can be employed. Anhydrides which demonstrate the reversible nature necessary to accomplish the separation and recovery process of the present invention can be represented as cyclic acid anhydrides containing a beta-diene structure. The presently preferred anhydride to produce a separable derivatized protein or enzyme is citraconic anhydride. Examples of other anhydrides which can be employed in the present invention include cyclic anhydrides including maleic anhydride and dimethyl maleic anhydride.

It is believed that the nucleoprotein complexes are held together by relatively weak covalent forces such as electrostatic interactions, hydrophobic interactions, and hydrogen bonding. Ionic linkages occur predominantly between the anionic phosphate groups of the nucleic acids and the cationic amino groups of the proteins or enzymes. Because of the large number of such weak associations, the nucleoprotein complex is quite stable under mild conditions.

It is believed that the anhydrides react with the primary amino groups of the proteins, peptides, or enzymes effecting a change in charge of the groups from cationic amino groups to anionic acid groups. Thus, the nucleoprotein complex becomes destabilized due to the increase in electronegativity in the derivatized protein which facilitates the separation of proteins, peptides, or enzymes from nucleic acids.

The amount of anhydride employed in the derivatization step is an amount at least sufficient to enhance the separation of the microbial protein or enzyme from the nucleic acid, when the protein, peptides or enzyme fraction is isoelectrically precipitated from the aqueous reaction medium.

Hereinafter, the term protein will include within its meaning the peptides and enzymes as well as the protein which are separable and recoverable within the scope of the present invention.

It is preferred that an amount of anhydride be employed which at least substantially reacts with the neucleoprotein complex containing material, e.g. disrupted microbial cellular suspension, as determined by estimating unreacted amino groups.

Typically protein containing cells are suspended in aqueous media and disrupted. The concentration of the cellular material is not critical and depends in part on the most efficient concentration useful in the disruption of homogenization equipment. Five to ten percent cellular suspensions are commonly employed.

The anhydride derivatization step is conducted at a pH of about 7.5 or higher, usually between a pH of about 7.5 to about 9.0. The temperature during the derivatization step is usually held below about 40° C. Most conveniently, the derivatization step is conducted at ambient temperatures; e.g. about 25° C.

It is essential that the anhydride be added to the cell homogenate incrementally, monitoring and adjusting the pH continuously or incrementally to maintain the pH above about 7.5.

Monitoring the pH serves a dual function, since when sufficient anhydride has been added so that after a reasonable reaction time; e.g. 15 minutes to an hour, no drop in pH is noted, substantially complete reaction of the anhydride with the protein-nucleic acid mixture is indicated.

After completion of the derivatization step, the pH of the system is lowered to the isoelectric point of the protein, typically in the pH range of about 4.0 to about 4.5, depending on the protein fraction from a nucleic acid enriched supernatant.

Alternatively, if a cell wall free or cell wall content reduced protein product is desired, the cell debris can be removed from the aqueous medium by appropriate means, such as centrifugation, prior to the protein precipitation step.

The precipitated protein which is recovered by suitable recovery means, such as centrifugation, is a protein modified by derivatization with an anhydride. The anhydride functionality on the protein can be removed by maintaining the modified protein at an acid pH for a period of time contingent on treatment temperature.

Part of essentially all of derivatized protein is converted to non-derivatized protein at acidic pH. When the acidic pH is greater than 5.0, removal of essentially all of the anhydride modifying groups such as the citraconyl blocking groups occurs only after a long incubation period at elevated temperatures such as 40 hours at 50° C. It is preferred that the process for the removal of the modifying groups from the protein be conducted at a pH of 5.0 or less, preferrably in a range from 3.5 to 4.5, most preferrably a range from 4.0 to 4.3.

While the percentage of deacylation (removal of the modifying groups) varies in response to pH, incubation time and temperature, essentially total deacylation occurs at temperatures at or about 30° C. at a pH of 5 or less within the eight hours. It is preferred that the incubation temperature be maintained at or below 50° C. as deacylation at elevated temperatures markedly decreases the solubility of the deacylated protein. It is also preferred that the incubation temperature be about 10° C. to reduce the amount of time necessary to complete deacylation.

The incubation time needed for essentially complete deacylation can vary from 20 minutes at optimum pH and temperature to 40 hours or more at a non-complementary acidic pH and temperature.

During the incubation period for the deacylation of the derivatized proteins, the pH is continuously monitored and maintained. At the end of the incubation period, the pH of the deacylated protein is adjusted to a basic pH, such as a pH of 8.5, using a reagent such as NaOH. This product is then dialyzed against water for 24 hours at 5° C. using standard dialysis technique. Finally the resultant protein is lyophilized.

An embodiment of the invention is described below.

*Saccharomyces cerevisiae* or *S. carlsbergenesis* yeast cells, with a nucleic acid content of about 12 to 15 grams of nucleic acid per 100 grams of crude protein, were washed three times with distilled water. A chilled 5% suspension of the cells in water was homogenized by means of three passes through a Manton-Gaulin homogenizer at 8000 psig.

The pH of the homogenate was raised to 8.5 with aqueous alkali (NaOH). Citraconic anhydride was incrementally added over a two hour period at 25° C. (total additional 0.4 gram of citraconic anhydride per gram of dry yeast).

At this point the resultant aqueous suspension was divided into two parts.

The first part was treated to yield a cell wall containing protein concentrate by decreasing the pH of the mass to between 4.2 to 4.5 using hydrochloric acid, and centrifuging at 5,000 rpm for twenty minutes. This precipitated protein concentrate was washed once with pH 4 water and dried to yield a protein concentrate containing between 1 and 2% nucleic acid.

The precipitated modified protein concentrate was further incubated at a pH of 4.0 and a temperature of 30° C. for a period of three hours. After the incubation period, the pH of the protein concentrate was adjusted to 8.5 using NaOH. The protein concentrate was subsequently dialyzed against water for 24 hours at 5° C., then it was lyophilized. The recovered protein concentrate was essentially completely deacylated (between 99 and 100% deacylation).

The second part of the aqueous suspension was treated to yield a protein isolate. Cell debris was removed by centrifugation and the supernatant was then pH adjusted and centrifuged as above to yield a protein precipitate which was washed with pH4 water and dried to yield a protein isolate containing between 1 and 2.5% nucleic acid and 92% protein. The recovered modified protein of this second part was subjected to the same deacylation process as the first part to yield a protein concentrate which was essentially completely deacylated.

The process of the invention can be conducted on a continuous or batch basis. And, while the process of the invention has been described as starting with a freshly cultured microbial cell material, it is applicable to preformed microbial proteinaceous material containing undesirable levels of nucleic acid.

While the invention has been exemplified above, it is understood that other microbial protein containing cellular material such as those described above can be utilized in place the particular yeast employed. The same is true for the anhydride. Likewise, the process conditions can vary within the skill of the art.

All parts and percentages throughout the specification are by weight unless otherwise specified. All temperatures are degrees Centigrade unless otherwise specified.

We claim:

1. A process of recovering microbially derived proteinaceous material essentially devoid of nucleic acid from nucleoprotein complexes which comprises:
   (a) disrupting microbial cells to provide a mixture comprising proteinaceous material and nucleic acid;
   (b) treating an aqueous mixture of proteinaceous material and nucleic acid with an organic dicarboxylic anhydride containing a beta-diene structure at a pH of above about 7.5 thereby derivatizing the proteinaceous material;
   (c) reducing the pH to isoelectrically precipitate the derivatized proteinaceous material and recovering the derivatized proteinaceous material which is thereby separated from nucleic acid;
   (d) maintaining the recovered derivatized proteinaceous material at an acidic pH until the derivatized proteinaceous material disassociates into the proteinaceous material and the organic dicarboxylic anhydrides or a derivative thereof, and separating and recovering the proteinaceous material.

2. A process as in claim 1 where the proteinaceous material is an enzyme.

3. A method as in claim 1 or 2 where the organic dicarboxylic acid anhydride is citraconic anhydride, maleic anhydride or dimethyl maleic anhydride.

4. A method as in claim 1 or 2 where the anhydride is citraconic anhydride.

5. A method as in claim 1 where the isoelectric precipitation of the derivatized proteinaceous material is conducted at a pH of 4.2 to 4.5.

6. A method as in claim 1 where the recovered derivatized proteinaceous material is maintained at an acidic pH of below about 5.0.

7. A method as in claim 6 where the acidic pH is 3.5 to 4.5.

8. A method as in claim 6 where the acidic pH is 4.0 to 4.3.

* * * * *